United States Patent Office 3,506,051
Patented Apr. 14, 1970

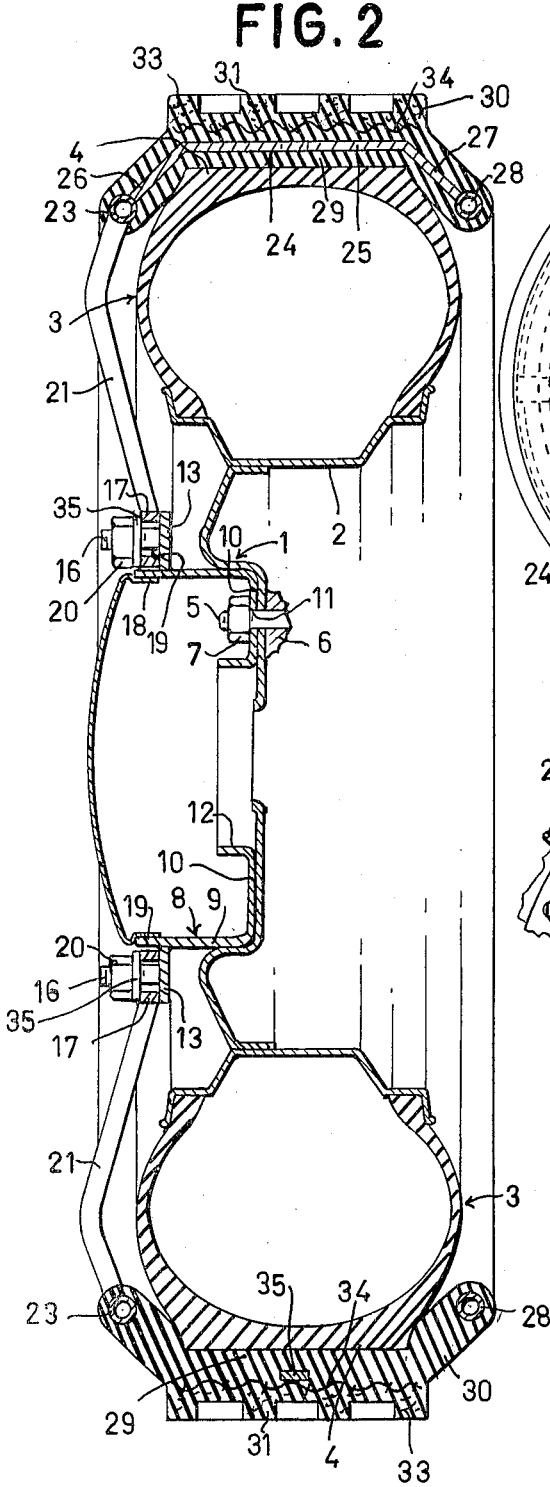
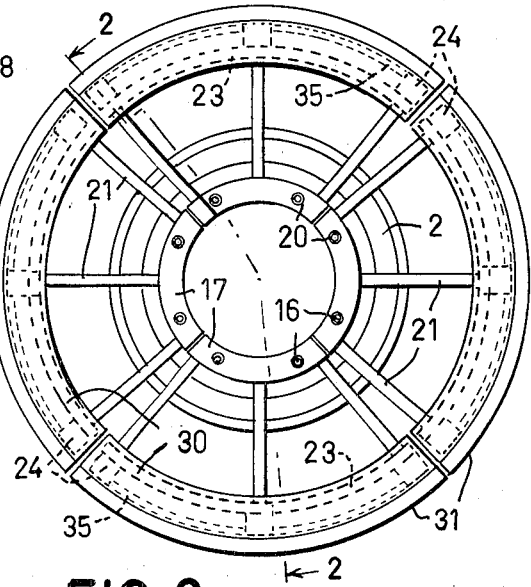
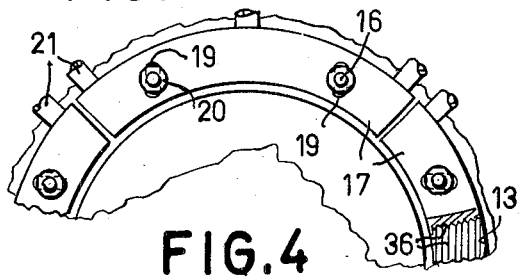
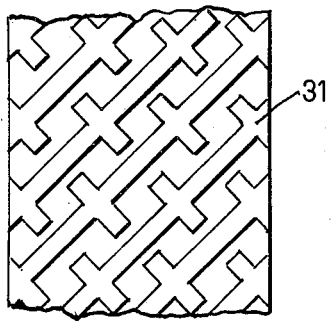

3,506,051
TRACTION-INCREASING DEVICE
Arthur C. Mathews, 15 Cordova Court,
Portola Valley, Calif. 94025
Filed Nov. 22, 1967, Ser. No. 685,041
Int. Cl. B60c 27/20
U.S. Cl. 152—216                          5 Claims

ABSTRACT OF THE DISCLOSURE

A traction device for releasable securement in a position extending over the tread of a pneumatic tire on a wheel on an automobile, which device is adapted to be positioned on such wheel, and removed therefrom, from the outer side of such wheel relative to the body or chassis of the vehicle.

BACKGROUND OF INVENTION

Heretofore, the use of chains on the pneumatic tires of road vehicles, as an anti-skid means, and to obtain traction on ice, snow and slippery surfaces, has been the commonly adopted expedient. However, chains are difficult to apply, and require manipulation in areas not readily accessible to an operator in a position alongside the vehicle. Also, they are injurious to tires, noisy when in use, uncomfortable to the passengers, and are as difficult to remove as to apply.

Attempts to overcome some of the above objections have resulted in so-called "mud and snow" tires, which provide an easier ride for those in the vehicle, but are considerably less efficient, are as costly, if not more so, than ordinary tires, and they normally remain on the wheels for long periods of time when not required, due to the trouble of changing tires. Their wear, being substantially more rapid than the wear of ordinary tires, results in a high cost per mile, compared with the cost of ordinary tires where the tires are not changed when required.

Other attempted substitutes for chains have been devices that are bulky, heavy, noisy when in use, complicated, and on which devices elements or shoes are employed, some of which are permanent installations on the automobiles.

Still other attempts provide mechanical means spaced from the tires for engaging the road surface alongside the tires, hence are independent of the tires.

In the present invention, anti-skid, or traction means, is provided that extend over the tire and which means is quickly attached and removed by an operator located at the outer lateral side of the body or chassis of the vehicle, without reaching to the inner side of the tire, and which means, when attached, is quiet compared to chains, and is far more efficient than the ice, snow and mud tires, and is economical to make and not injurious to the tires. Also, there is no objectionable jolting or the like as the tires move over the road.

Other objects and advantages will appear in the description and drawings.

SUMMARY

The attachment comprising the invention comprises a plurality of separate segments of an annular tread-engaging body each having a radially inwardly facing surface adapted to extend over and to engage the road-engaging surface of a tire. Each segment has anti-skid, traction-increasing road engaging projections on its radially outwardly facing surface, wihch segments are in a tread-covering position substantially covering said tread on the tire circumferentially of said tire when on the latter, and holding means is provided for securing said segments against said tread, which holding means includes extending radially inwardly from said segments, and connecting means secured to the inner ends of said elements connecting said elements at their inner ends.

DESCRIPTION OF DRAWINGS

In the drawings, FIG. 1 is a side elevational view of the invention on a conventional automobile wheel.

FIG. 2 is an enlarged vertical cross-sectional view along line 2—2 of FIG. 1.

FIG. 3 is an enlarged portion of the device of FIG. 2.

FIG. 4 is a fragmentary elevational view of a tread design.

In detail, a conventional wheel structure is generally designated 1, and includes a rim 2 and a pneumatic tire 3 thereon, having a tread 4. The usual stud bolts 5 on hub 6 have nuts 7 thereon for securing the wheel to the hub, and the latter is connected with the axle (not shown) in the usual manner. The foregoing elements are old and well understood by those skilled in the art.

In the present invention, an adapter, generally designated 8, comprises a cylindrical member 9, having a radially inwardly projecting flange 10 on one end, which flange is formed with openings 11 therein corresponding in number and in positions to the number and positions of stud bolts 5 so that the adapter 8 may be secured to the wheel of an automobile for rotation therewith, by means of said stud bolts 5 and nuts 7.

The flange 10 may be formed with an inturned marginal portion 12 around the radially inner edge of said flange 10, thus coacting with said cylindrical portion 9 and flange 10 to provide an axially outwardly opening channel into which the ends of said stud bolts 5 project, and within which nuts 7 are positioned. Said portion 12 also defines the sides of the central opening in the adapter into which conventional wheel elements (not shown) may project.

At its outer end, of the end opposite to the flange 10, the cylindrical member 9 is provided with a flat-sided ring 13, integral wth portion 9 or rigid therewith, which ring is provided with an annular row of spaced stud bolts 16 projecting axially outwardly thereof in substantially the same manner as stud bolts 5 project from hub 6. The particular manner in which bolts 16 are secured to ring 13 is immaterial, but they are preferably rigid with and inseparable from ring 13 for convenience and to prevent loss.

A plurality of separate segments 17 of a ring (FIG. 1) substantially corresponding to ring 13 in diameter, but which segments are preferably thicker, are adapted to be positioned around the axially outwardly projecting portion 18 of member 9, and against the outer side of ring 13. Each of said segments is formed with a pair of parallel slots 19 for passing an adjacent pair of stud bolts 16 therethrough.

The segmented ring, as illustrated, comprises four equal segments 17, and the stud bolts are equally spaced apart and the slots 19 are arranged symmetrically on each segment so that a pair of said slots in each segment will pass a pair of bolts 16. The segments 17, when positioned at their radially innermost limits around the extension or projection 18 of member 9, will be in approximately abutting relation at their ends, but the parallel arrangement of slots 19 in each segment permits radially outwardly adjustment on the adapter 8. Any suitable nuts 20 or bolts 16, preferably of the same size as nuts 7, may secure the segments 17 to ring 13 and consequently to adapter 8. Thus, the same wrench will fit nuts 7 and 20.

A plurality of spokes or bars 21 extend generally radially outwardly of the segments 17 and are rigidly secured at their inner ends to said segments. These spokes may be of tubular steel to better resist distortion in any direction, and three are shown on each segment, a pair being adjacent the ends of each segment, and one being midway between the spokes of each such pair, although it is to be understood that more or less may be employed according to the character of the vehicle, and other considerations.

An annularly extending segment 23 of a ring that is coaxial with the ring comprised of segments 17, is rigidly secured to the outer end of each spoke 21. The segments 23 may be of tubular steel and the ends of each segment 23 terminate substantially on the same radial lines from the axis of the member 9 as define the ends of segments 17, so that the ends of segments 23 will be approximately in abutting relation when the ends of segments 17 are substantially in abutting relation.

Integrally secured to segments 23 at points opposite to the outer ends of spokes 21 are one of the ends of cross bars 24 that are generally of U-shape longitudinally thereof to approximately conform to the cross-sectional contour of tread 4 of tire 3, and which cross bars are adapted to extend across said tread. The open side of each cross bar faces radially inwardly and the central portion 25 of each bar 24 (FIG. 2) intermediate its end may be substantially straight or parallel to the radially outwardly facing surface of the tread 4, while end portions 26, 27 (FIG. 2) extend divergently outwardly and over the shoulders of the tire when the segments extend over said tread portion 4. The end portions 26 are rigidly secured to the segments 23, and segments 28, corresponding to segments 23, are integrally connected to the outer ends of the end portions 27 of said cross bars.

Rubber or rubber-like material 29 (FIG. 2) which will generally be called plastic material, is vulcanized or welded to and encloses the segments 23, 28 of each pair and also the cross bars 24, and outer end portions of the spokes 21 and, in the preferred form, extends between the cross bars 24 of each set of segments. The portion of the plastic material 29 radially inwardly of the cross bars may be relatively soft so that the tread design of tire 3 may be impressed onto the material when the segments of the plastic material are tight against the tire or when some of the weight of the vehicle is on a segment, while the outer portion 31 radially outwardly of the cross bars, may be of substantially the same hardness as that of tread 4.

Said portion 31 is formed with a tread design or pattern that is preferably more open than that of the tread on conventional snow and mud tires to give substantially greater anti-skid and traction-increasing characteristics.

The open pattern of the tread (FIG. 4) is similar to that on tires, in that it provides for the escape of water on the pavement where the tread engages the pavement, instead of trapping the water.

The plastic material 29 follows substantially the same cross-sectional contour as that of the cross bars, and the spokes 21 extend angularly outwardly from segments 17 (FIG. 2) so as to clear the outer side of a tire 3, even if the latter were underinflated, and said spokes then generally extend at their outer end portions toward longitudinal alignment with the end portions 26 of cross bars 24.

The angular relation between the end portions 26, 27 of the cross bars, and the central portion 25 thereof, is such that segments 23, 28 (which may be called "bead" portions) and their plastic covering, will not engage the shoulders of the tire.

From the foregoing, it is seen that the attachment, or device, comprises a plurality of separate, and separable sections, each having a tread portion that extends over the tire of an automobile, and substantially continuously in circumferential direction. Each section includes its inner and outer segments, the outer being generally designated 30, includes the tread portion 31 and the portions extending over the shoulders of the tire, and the inner comprises the segments 17, while means at the outer side of the wheel and tire 3 connect the inner and outer segments.

In operation, three of the sections may be quickly positioned on a tire that is supported on the pavement at the gap for the fourth section, and nuts 20 may be positioned in the stud bolts 16 of said three sections, but not tightened.

In the structure as shown in FIG. 2, metal shavings or turnings 33 may be incorporated in the plastic of the tread portion to provide further anti-skid and added traction characteristics, and any suitable fabric reinforcing 34 may also be bonded within the plastic in the same manner as the fabric or breaker strips in a tire. Also, metal strips 35 or rods may be integrally secured to and extend between the adjacent pairs of cross bars 24 intermediate and parallel with segments 23, 28.

In all forms of the invention, lock washers 35 may be interposed between the nuts 20 and segments 17 or any other conventional suitable means may be employed to resist loosening of the nuts and movement of the segments 17 relative to the stud bolts 16 when the nuts 20 are tightened. The engaging faces of the sections 17 and the ring 13 are formed with complementarily formed ridges and grooves 36 (FIG. 3) extending perpendicular to the radii of the respective segments 17 to positively lock the segments against radially outward movement when nuts 20 are tightened.

Inasmuch as the tire 3 carries substantially all of the weight of the vehicle, the stud bolts 16 and nuts 20 merely hold the tread engaging plastic covered segments tightly against the tread portion of the tire when the weight of the vehicle is off the segment, and against centrifugal force tending to move the tread engaging segments outwardly during rotation of the wheel, but this structure, including spokes 21, is sufficiently strong to support a substantial portion of the weight of the vehicle in the event of underinflation of the tire.

It is to be understood that various modifications in the structure above disclosed may occur without departing from the spirit of the invention, and the claims are intended to cover any modifications coming within the terms thereof.

I claim:

1. An attachment for installation on a wheel of a road vehicle, which wheel is secured to the latter by bolts spaced around its axis and which wheel includes a pneumatic tire having a road-engaging tread, sidewalls and shoulder portions at the junctures between said sidewalls and tread, comprising:

(a) a plurality of separate segments of an annular tread-engaging body each having a radially inwardly facing surface adapted to extend over and to engage said road-engaging tread of said tire;

(b) each of said segments having anti-skid, traction-increasing road-engaging projections on its radially outwardly facing surface, and said segments being in tread-covering position substantially covering said tread circumferentially of said tire, and against said tread, when on said tire;

(c) holding means for securing said segments against said tread in said tread-covering position including elements extending radially inwardly from said segments and connecting means secured to the inner ends of said elements connecting said inner ends;

(d) each of said segments being generally U-shaped in cross-sectional contour with the open side of said U-shape facing radially inwardly for receiving said tread thereon against the closed end of said U when said segments are in tread-covering position and with the sides of said U-shape extending divergently from said closed end to positions spaced outwardly of the side walls of said tire;

(e) a rigid arcuately extending bead member integral with each of said segments along the edges of the sides of said segments substantially coextensive with each segment;

(f) said elements being rigidly connected at one of their ends with the bead members at one side only of said segments, and rigid cross members connecting the bead members of each section enclosed within said segments, said segments being a body of rubber-like material.

2. An attachment for installation on a wheel of a road vehicle, which wheel is secured to the latter by bolts spaced around its axis and which wheel includes a pneumatic tire having a road-engaging tread, sidewalls and shoulder portions at the junctures between said sidewalls and tread, comprising:

(a) a plurality of separate segments of an annular tread-engaging body of flexible rubber-like material, each being generally U-shaped in cross-sectional contour with the open side of said U-shape facing radially inwardly for receiving said tread therein with said tread against the closed end of said U and for extending partially over the opposite sides of such tire when said segments are in tread-covering position;

(b) each of said segments having anti-skid, traction-increasing road-engaging projections on its radially outwardly facing surface, and said segments being in tread-covering position substantially covering said tread circumferentially of said tire, and against said tread, when on said tire;

(c) rigid means enclosed within the rubber-like material of each segment for reinforcing each segment against distortion longitudinally and transversely thereof upon each segment being held tightly against the tread of said tire by connecting means connected with and extending radially inwardly from one side only of each segment, and (d) connecting means connected with said rigid means at said one side only of each segment for so holding each segment tightly against the tread of a tire when said segments are in said tread-covering position on a tire on a vehicle and said vehicle is moved over the ground.

3. In an attachment as defined in claim 2;

(e) said connecting means including a plurality of separate segmental sections of rigid material respectively spaced radially inwardly of said rubber-like segments, and a plurality of separate elements respectively connecting each of said rubber-like segments with one of said segmental sections, and means for releasably connecting said segmental sections with the wheel carrying the tire having the tread to be received in and covered by said separate segments.

4. In an attachment as defined in claim 2;

(e) said segments including said projections thereon having a relatively stiff rubber-like anti-skid road-engaging surface and a relatively soft resilient radially inner surface engageable with and deformable by the tread of the tire when said body is in said tread-engaging position, and said segments are secured against said tread to resist slippage of said segments relative to said tread.

5. In an attachment as defined in claim 2;

(e) said connecting means including an annular member spaced radially inwardly from and coaxial with said segments when the latter are in tread-covering position and a plurality of spaced, elongated elements secured at their outer ends to one side only of each of said segments and at their inner ends to said annular member;

(f) said rigid means including U-shaped members of generally the same cross-sectional contour of each segment to extend across the tread and partially over the sides of such tire, and each of said elements being connected to one of the ends of rigid means.

References Cited

UNITED STATES PATENTS

| | | | |
|---|---|---|---|
| 1,593,129 | 7/1926 | Matthews | 152—216 |
| 3,079,971 | 3/1963 | Iaquinta | 152—179 |
| 3,093,180 | 6/1963 | Jones | 152—216 |

ARTHUR L. LA POINT, Primary Examiner